Aug. 7, 1956     B. B. JACOBSEN ET AL     2,758,287
ARRANGEMENTS FOR COMPENSATING THE EFFECTS OF DISCONTINUITIES
IN ELECTROMAGNETIC WAVEGUIDES
Filed Aug. 20, 1952     2 Sheets—Sheet 1

*Inventor*
B.B. JACOBSEN —
L. LEWIN
By Philip M. Bolton
*Attorney.*

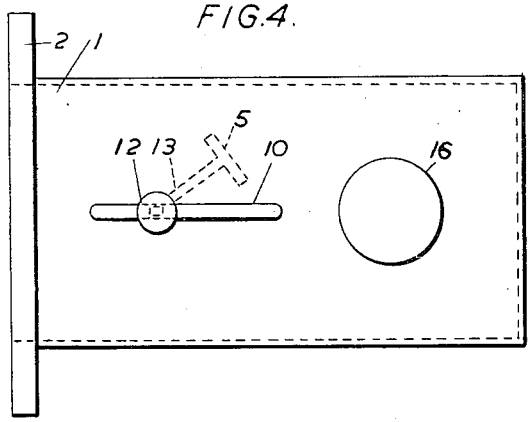
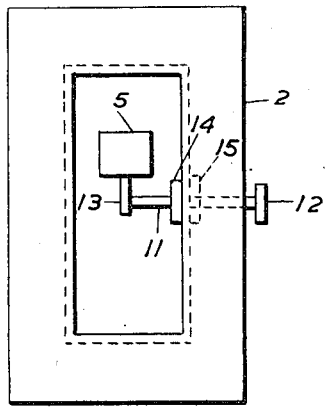
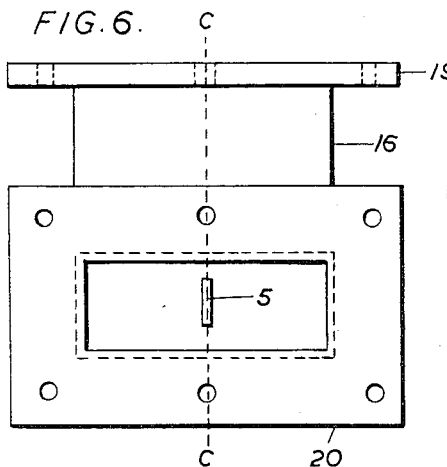
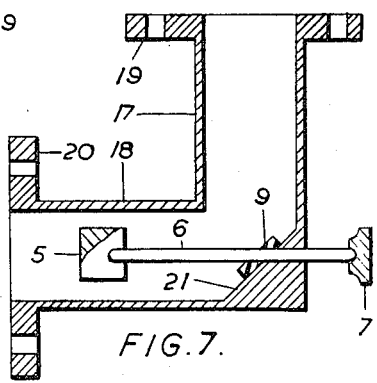

United States Patent Office 2,758,287
Patented Aug. 7, 1956

2,758,287

ARRANGEMENTS FOR COMPENSATING THE EFFECTS OF DISCONTINUITIES IN ELECTROMAGNETIC WAVEGUIDES

Bent Bulow Jacobsen and Leonard Lewin, London, England, assignors to International Standard Electric Corporation, New York, N. Y.

Application August 20, 1952, Serial No. 305,426

Claims priority, application Great Britain August 23, 1951

7 Claims. (Cl. 333—98)

The present invention relates to arrangements for compensating the effects of discontinuities in electromagnetic waveguides.

In a waveguide transmission system, it is very difficult to avoid introducing impedance discontinuities which cause undesirable reflections of the waves in the guide. In particular, discontinuities usually occur at the points where the waveguide system is connected to wave generating or utilisation apparatus. The principal object of the present invention is to provide a simple means for compensating the effects of such discontinuities.

The principle on which the invention is based is the introduction of an adjustable reflecting element into the guide which produces a reflected wave which neutralises the wave reflected from the discontinuity. If the reflecting element is arranged as near as possible to the source of the discontinuity, compensation over a relatively wide band of frequencies can be obtained.

The above-stated object is achieved according to the invention by providing an electromagnetic waveguide transmission system having a point at which an impedance discontinuity is present from which undesired reflection of waves transmitted through the guide system occurs, comprising a reflecting element placed inside the waveguide and adjustable from outside the waveguide in such manner as to produce a reflected wave of such amplitude and phase as substantially to neutralise the wave reflected from the said discontinuity.

In particular, the invention may be usefully applied to a travelling wave amplifier, in which impedance discontinuities practically always occur in the coupling between the ends of the helix and the input and output waveguide circuits.

The invention will be described with reference to the accompanying drawings in which:

Fig. 1 shows a view looking into the open end of the waveguide section; Fig. 2 shows a section taken along the lines A—A of Figs. 1 and 3; and Fig. 3 shows a section taken along the lines B—B of Fig. 1;

Fig. 4 shows a top view of waveguide section in which the invention is applied in an alternative manner;

Fig. 5 shows a view looking into the open end of the waveguide section shown in Fig. 4;

Fig. 6 shows a view looking into the open end of one limb of an E-type waveguide corner element to which the invention has been applied; and Fig. 7 shows a section taken on the line C—C of Fig. 6.

Figure 3:
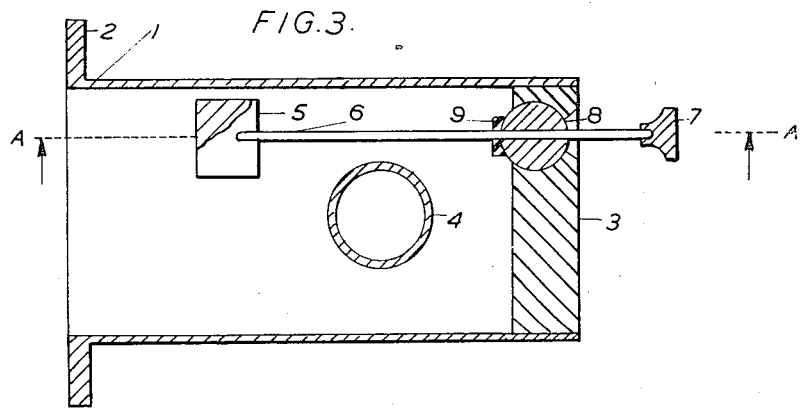
Figs. 1, 2 and 3 show the invention applied to neutralising the effect of the discontinuity at the point where a waveguide section is coupled to a travelling wave amplifier tube.
Figure 2:
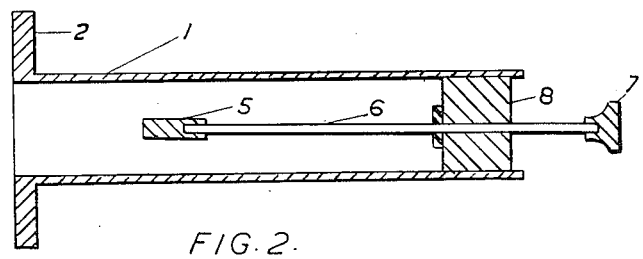
Figure 1:
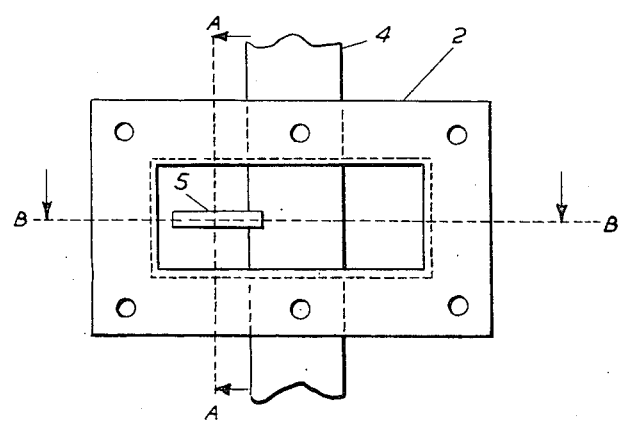

In the arrangement shown in Figs. 1, 2 and 3, a waveguide section 1 of rectangular cross-section is provided with a flange 2 by means of which it may be coupled to other waveguide sections or apparatus not shown. The other end of the guide section is closed by a metal block 3, and a travelling wave amplifier tube, of which only part of the envelope 4 is shown, passes through circular holes in the wider walls of the guide section. The coupling between the waveguide and the travelling wave tube will normally be designed to be free from reflections, but it is found that small manufacturing variations produce discontinuities from which undesired reflections are obtained. According to the invention, such reflections are compensated by means of a reflecting element 5 in the form of a small metal plate arranged inside the guide section, and mounted on a rod 6 preferably of insulating material which passes through the block 3 and terminates in a knob 7 by which it may be shifted. The rod 6 passes through a cylindrical bush 8 which can rotate in the block 3. By this means it is possible to rotate the element 5, and to move it parallel to the axis of the guide section, and to swing it across the guide. These movements permit the reflection from the element 5 to be adjusted in magnitude and phase so that it neutralises the discontinuity produced at the coupling to the travelling wave tube.

When the element 5 is in the position shown in Fig. 1, it produces a maximum reflection, while a minimum reflection is produced when it is rotated through 90°. The reflection is also increased if the element is swung nearer to the axis of the guide section. By moving the element 5 in a direction parallel to the axis of the guide, the phase of the reflection is changed.

In order to find the proper adjustment, the reflection factor should be measured at the open end of the guide by any suitable means, and the element 5 should be adjusted until a minimum or zero reflection factor is obtained.

It may not be necessary to provide the swinging movement, in which case the bush 8 may be omitted, and the rod 6 may then be arranged to slide in a fixed hole drilled through the block 3 parallel to the axis of the guide.

If the waveguide is to be operated over a frequency band of appreciable width, the adjustment should be made at the mean frequency of the band, and experience has shown that good compensation will be substantially obtained over a relatively wide band if the reflecting element is located as near as possible to the source of the discontinuity.

The rod 6 could, if desired, be a metal rod, but in that case it would tend to resonate. It would be necessary therefore either to design the rod so that the resonance occurs outside the frequency band for which the arrangement is designed, or alternatively the resonance should be damped so that its effect is negligible.

Damping may be effected by providing a wave-absorbing impedance such as a ring 9 of carbonyl-iron dust surrounding the rod 6, the point where it enters the guide. The ring 9 may be attached to the bush 8 as shown, or if the latter is omitted, it may be attached to the block 3. It should be emphasized, however, that these expedients are not necessary if the rod 6 is of insulating material.

It may be added that the reflecting plate 5 might have been constructed of insulating material instead of metal.

The arrangement shown in Figs. 4 and 5 is rather simpler than that of Figs. 1, 2 and 3, but is only possible if the wider wall of the guide section is accessible. As shown in Fig. 4, a narrow slot 10 is cut along the centre line of the wider wall of the guide, and a rod 11 with a knob 12 passes through the slot, and carries the reflecting element 5, which is mounted on an intermediate radial rod 13, seen in Fig. 5. The elements 5 and 13 are shown dotted in Fig. 4 to indicate that they are inside the guide section.

The rod 11 may be provided with bearing bushes 14 and 15, or other suitable arrangement for supporting the rod in the slot. In Fig. 4, 16 is the hole for the travelling wave tube, but the latter has not been shown.

It will be evident that by sliding the rod 11 along the slot and rotating it, by means of the knob 12, the reflecting element 5 can be located in any desired position within a relatively large area of the guide section.

Figs. 6 and 7 show the manner in which the invention may be applied to provide compensation inside an E-type corner element in a rectangular wave guide, that is, a corner in which the electrostatic lines of force are turned through 90°. The two limbs 17 and 18 of the corner element meet at right angles and are provided with the usual flanges 19 and 20 by means of which they may be bolted to other wave-guide sections (not shown). According to the usual practice, the outer corner is chamfered off on the inside by an inclined surface 21, the degree of chamfering being selected to produce the minimum reflection factor at the mean frequency of the operating band.

If there is an impedance irregularity in the corner element or elsewhere in the waveguide system, of which the corner element forms a part, the irregularity may be compensated according to the invention by providing inside one limb of the band a reflecting element 5 mounted on a rod 6 which passes outside the corner element through a hole in the chamfered portion, and can be adjusted along the axis of the limb and rotated by means of the knob 7. The required adjustment of the reflecting element 5 is found by making reflection factor measurements either at the mouth of one limb of the corner element, or at some other convenient point in the waveguide system.

As in the case of the embodiment illustrated in Figs. 1 to 3, if the rod 6 is made of metal, objectionable resonances may be damped out by attaching a carbonyl-iron dust ring 9 to the inclined wall 21, but this ring is not required if a rod of insulating material is used.

While the principles of the above invention have been described above in connection with specific embodiments and particular modifications thereof, it is to be clearly understood that this description is made by way of example and not as a limitation on the scope of the invention.

What we claim is:

1. An electric transmission system in which waves are transmitted through an electromagnetic waveguide of rectangular cross-section having a point at which an impedance discontinuity is present from which undesired reflection of waves transmitted through the waveguide occurs, comprising a reflecting plate arranged inside the guide near the said point and mounted on a rod passing through an opening in one of the walls of the waveguide, means for adjusting from outside the waveguide the linear distance between said plate and said opening, means for adjusting the inclination of the plane of the plate with respect to the walls of the waveguide and means for swinging said plate angularly with respect to the center of said opening, for the purpose of producing a reflected wave of such amplitude and phase as substantially to neutralise the wave reflected from the said discontinuity.

2. A system according to claim 1 in which the reflecting plate is arranged inside a section of waveguide having one end closed, and in which the said plate mounted on said rod which passes outside the waveguide section through a hole in the closed end, the arrangement being such that the inclination of the plate may be changed by rotating the rod, and its position in the section may be changed by sliding the rod through the hole.

3. A system according to claim 2 in which the rod slides through a hole in a bush rotatably fixed in the said closed end whereby the angle between the rod and the axis of the guide may be varied by swinging said rod and bush.

4. A system according to claim 1 in which the reflecting plate is attached by a radial arm to a rod which passes perpendicularly through a longitudinal slot in one of the wider walls of the waveguide, the arrangement being such that the inclination of the plate may be changed by rotating the rod, and its position in the waveguide may be changed by sliding the rod along the slot.

5. A system according to claim 1 in which the said rod is of electrically conducting material, and in which resonance thereof is damped by a ring of electric wave absorbing material surrounding the rod inside the waveguide near the point at which it enters the waveguide.

6. A system according to claim 5 in which the ring is composed of carbonyl-iron dust.

7. A system according to claim 1 in which the reflecting plate is constructed of electrically conducting material.

References Cited in the file of this patent
UNITED STATES PATENTS

| Re. 23,131 | Webber | June 28, 1949 |
| 2,526,579 | Ring | Oct. 17, 1950 |
| 2,701,861 | Andrews | Feb. 8, 1955 |

OTHER REFERENCES

Publication I—Ragan: Microwave Transmission Circuits, vol. 9. Radiation Laboratory Series, Published 1948; pp. 535, and 536 relied on. Copy in Div. 69.

Publication II—Granfham: "A Reflectionless Wave-Guide Termination," The Review of Scientific Instruments, vol. 22, No. 11, November 1951, pp. 828–834.